United States Patent [19]
Kallin et al.

[11] Patent Number: 6,058,308
[45] Date of Patent: *May 2, 2000

[54] APPARATUS, AND ASSOCIATED METHOD, FOR ADAPTIVELY SELECTING A PAGING AREA IN WHICH TO PAGE A MOBILE TERMINAL

[75] Inventors: Harald Kallin, Sollentuna; Walter Ghisler, Upplands Väsby, both of Sweden

[73] Assignee: Telefonaktiebolaget L M Ericsson, Stockholm, Sweden

[*] Notice: This patent issued on a continued prosecution application filed under 37 CFR 1.53(d), and is subject to the twenty year patent term provisions of 35 U.S.C. 154(a)(2).

[21] Appl. No.: 08/802,047

[22] Filed: Feb. 18, 1997

[51] Int. Cl.$^7$ ...................................................... H04Q 7/20
[52] U.S. Cl. ............................. 455/432; 455/435; 455/458
[58] Field of Search ..................................... 455/414, 422, 455/432, 436, 441, 456, 458, 517, 560, 426, 510, 435

[56] References Cited

U.S. PATENT DOCUMENTS

| | | | |
|---|---|---|---|
| 5,153,902 | 10/1992 | Buhl et al. | 455/414 |
| 5,276,911 | 1/1994 | Levine et al. | 455/510 |
| 5,305,466 | 4/1994 | Taketsugu | 455/33.1 |
| 5,369,681 | 11/1994 | Boudreau et al. | 455/456 |
| 5,408,683 | 4/1995 | Ablay et al. | 455/33.1 |
| 5,533,094 | 7/1996 | Sanmugam | 455/426 |
| 5,613,199 | 3/1997 | Yahagi | 455/426 |

FOREIGN PATENT DOCUMENTS

| | | |
|---|---|---|
| 0 732 863 A2 | 9/1986 | European Pat. Off. |
| 0 666 700 A1 | 8/1995 | European Pat. Off. |
| WO 94/07337 | 3/1994 | WIPO |

OTHER PUBLICATIONS

Seshu Madhavapeddy, Kalyan Basu and Allison Roberts; Adaptive Paging Algorithms for Cellular Systems; IEEE, Proceedings of the Vehicular Technology Conference, Chicago, IL, Jul. 25–28, 1995; pp. 976–980.

Joseph S.M. Ho and Ian F. Akyildiz; Mobile User Location Update and Paging Under Delay Constraints; Wireless Networks, vol. 1, No. 4, Dec. 1, 1995; pp. 413–425.

George L. Lyberopoulos, John G. Markoulidakis, Dimitrios V. Polymeros, Dimitrios F. Tsirkas, and Efstatios D. Sykas; Intelligent Paging Strategies for Third Generation Mobile Telecommunication Systems; IEEE Transactions on Vehicular Technology, vol. 44, No. 3, Aug. 1, 1995; pp. 543–553.

*Primary Examiner*—Nguyen Vo
*Attorney, Agent, or Firm*—Jenkens & Gilchrist, P.C.

[57] ABSTRACT

Apparatus, and an associated method, for adaptively selecting a paging area throughout which to page a mobile terminal. A record is maintained, indicative of the position where a mobile terminal was located when last-accessing the network infrastructure of a communication system in which the mobile terminal is operable. When a page is to be broadcast to the mobile terminal, the record is accessed, and the paging area throughout which the page is broadcast is adaptively selected responsive thereto.

17 Claims, 5 Drawing Sheets

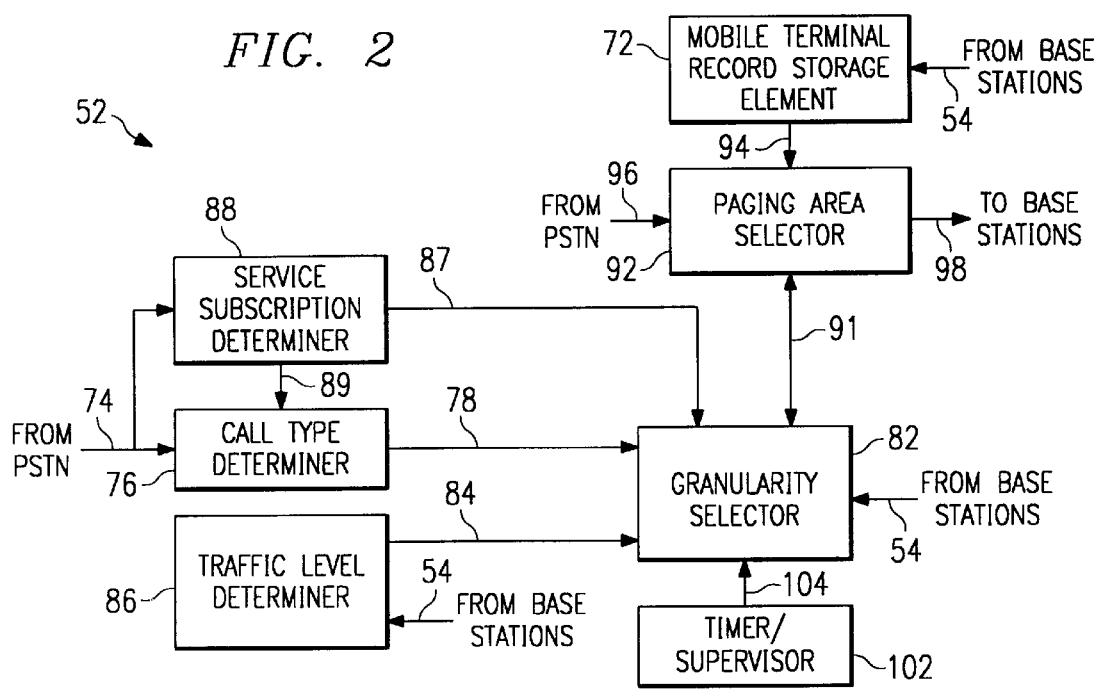
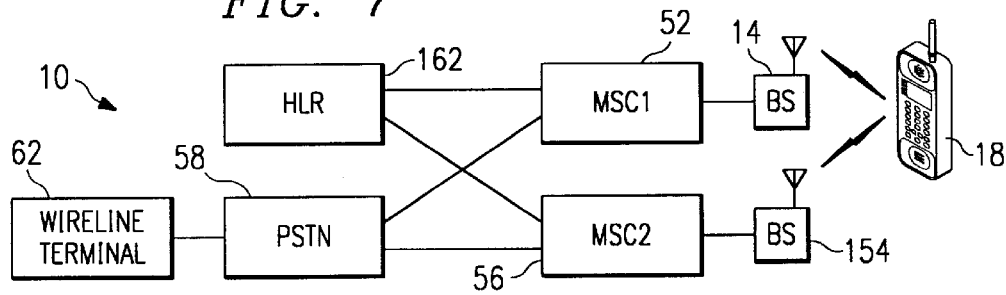
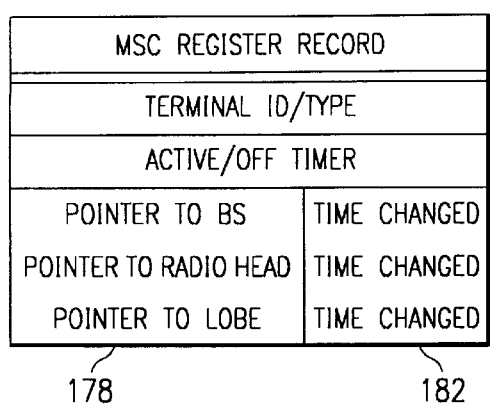
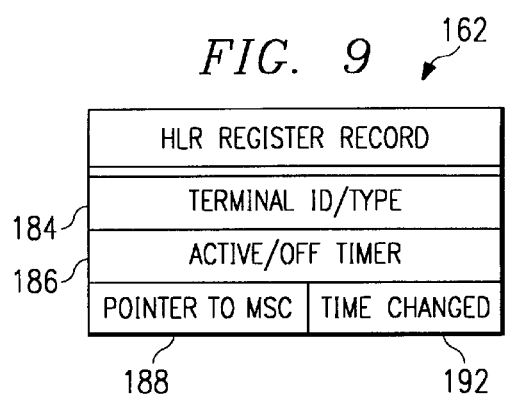

APPARATUS, AND ASSOCIATED METHOD, FOR ADAPTIVELY SELECTING A PAGING AREA IN WHICH TO PAGE A MOBILE TERMINAL

The present invention relates generally to paging procedures by which to page a mobile terminal in a radio communication system. More particularly, the present invention relates to apparatus, and an associated method, for efficiently paging a mobile terminal.

A record is maintained of the area in which the mobile terminal was positioned when the mobile last accessed a network station of the network infrastructure of the communication system. When the mobile terminal is to be paged, the paging area throughout which the page is to be broadcast is selected responsive to the area maintained in the record. If no acknowledgment to the page is made by the mobile terminal, the paging area is adaptively altered, but still in a manner responsive to the area maintained in the record.

When embodied in a cellular communication system, a record is maintained of the cell in which the mobile terminal was located when last accessing a base station of the cellular network. When the mobile terminal is to be paged, the paging area is first selected to be formed, e.g., of only the cell of which the record is maintained. If the mobile terminal does not respond to the paging within the cell, transmission of the page may be repeated in the cell, or the paging area may be adaptively increased or otherwise altered and the page retransmitted in this altered paging area. Selection of the paging area is made based upon the position at which the mobile terminal is most likely to be located.

Paging of the mobile terminal in this manner sparingly utilizes system paging resources, all without unduly affecting the times in which the mobile terminal is required to respond to a network station. By paging the mobile terminal in locations in which the mobile is most likely to be positioned, the mobile terminal can be repeatedly paged, if necessary, without overloading signaling links and air interfaces used to page the mobile terminal.

BACKGROUND OF THE INVENTION

Utilization of cellular, and other radio, communication systems has achieved wide popularity in recent years. Communications between a mobile terminal and a network station can be effectuated without a wireline connection. Communications can therefore be effectuated when the use of a wireline connection would be inconvenient or impractical.

Cellular networks, for instance, have been installed to encompass many geographic areas. When a mobile terminal operable to communicate by way of such a cellular network is within range of the network, wireless communication by way of the network can be effectuated.

To ensure that apparatus manufactured by different manufacturers are operable in a selected cellular system, standards have been promulgated which define operational parameters of selected ones of such systems. Constructing apparatus which is operable pursuant to the promulgated, operational parameters ensures that such apparatus shall be operable in the selected system.

AMPS (Advanced Mobile Phone Service), TACS (Total Access Communication System), DAMPS (Digital Advanced Mobile Phone Service), GSM (General System for Mobile communications) and PDC (Pacific Digital Cellular) cellular communications systems are all exemplary of cellular communication systems for which standards have been promulgated. In each of such standards, standardized protocols are set forth. Such protocols define communication procedures which permit communications with a mobile terminal operable in the respective communication systems.

For instance, such standards define procedures to be carried out when a call is to be terminated at a mobile terminal. Typically, when a call is to be terminated at a mobile terminal, the mobile terminal is first paged on a paging channel. The page, typically including the mobile station identity (MSI), provides an indication to the mobile terminal that the call is to be terminated at the mobile terminal.

Once a mobile terminal responds to a page, control information is provided to the mobile terminal. For example, control information is provided to the mobile terminal to instruct the mobile terminal to tune to a particular traffic channel, thereby to permit the mobile terminal to receive the call transmitted upon the traffic channel to the mobile terminal.

Because the mobile terminal is, at least potentially, inherently mobile, the precise position in which the mobile terminal is located is not necessarily known. That is to say, there is a certain level of uncertainty regarding the precise position at which a mobile terminal is located.

Periodic, or other, registration procedures are typically carried out when the mobile terminal is in an idle mode of operation. The purpose, in part, of a registration is to provide the network with an indication of the position at which the mobile terminal is located. In a registration procedure, a mobile terminal reports its whereabouts by accessing a network station at regular intervals, e.g., every fifteen minutes. The network station which receives the registration report is indicative of the position in which the mobile terminal is located. By such registration, the mobile terminal also indicates to the network station that the mobile terminal is in an on-state and ready to receive a terminating call if placed thereto. Conversely, in the absence of a registration for a longer time than the periodic registration interval, the network of the communication system is able to determine that the mobile terminal has been turned-off or has moved beyond the coverage area of the communication system.

In at least several of the above-noted communication systems, location areas are defined. Location areas are defined to be groups of cells. Each base station of the cellular network infrastructure defines, typically, a small number of, e.g., three cells. The term "base station" is used in a generic sense herein. It should be understood that a base station refers generally to a cell site formed of one or more transceivers with similar properties and the term cell refers to a geographical area encompassed by the cell site.

In an AMPS or TACS communication system, a location area is a fixed area. In a PDC system, the location area is centered about a cell whereat the mobile terminal is registered. And, in a communication system defined in EIA/TIA Standard Document IS-136, a location area is defined for a particular mobile terminal by providing the mobile terminal with a list of cells which together define the location area. When a mobile terminal travels out of one location area and into another location area, the mobile terminal also transmits a registration report to the network. The location area is usually determinative in such systems of the paging area throughout which a page is transmitted when a mobile terminal is paged.

When the mobile terminal is to be paged, a page is broadcast upon a paging channel to the mobile terminal. The page is repeated one or more times in the event that the mobile terminal does not acknowledge reception of a page broadcast thereto. If the mobile terminal is located beyond the range of the communication system or is turned-off (i.e., in an inactive state), the mobile terminal does not detect the page and does not acknowledge detection thereof. But, additionally, if the mobile terminal is temporarily not tuned to the paging channel upon which the page is broadcast, the mobile terminal also is unable to detect the page. And the page might be transmitted upon a channel which exhibits excessive levels of interference or fading, preventing reception of the page at the mobile terminal. Therefore, broadcast of a page must often have to be repeated. Because, however, the paging channel is of limited capacity, the number of pages broadcast to a mobile terminal should be minimized. The need repeatedly to page a mobile terminal throughout a large area, i.e., a large number of cells, is contrary to the goal of minimizing usage of the paging channel.

To maximize the number of pages which can be broadcast to the mobile terminal without exceeding a paging channel capacity requires that the size of the paging area be minimized. However, reduction in the size of the paging area should not be accompanied by a corresponding increase in mobile terminal registration reports. Such an increase would increase the registration load imposed upon the communication system. Each additional registration report would increase the load imposed upon the network.

There is a need to balance the competing requirements of minimizing the paging load imposed upon the communication system and minimizing the registration load imposed upon the communication system.

AMPS and TACS cellular communication systems are typically constructed in manners to optimize paging response time. Paging load has, historically, not been a significant concern. That is to say, in such systems paging is performed simultaneously throughout a paging area formed of an entire location area, typically formed of between thirty and one hundred-fifty cells. If the page is required to be rebroadcast, the paging area is increased, to be formed of, e.g., three to five location areas.

The need to broadcast a page throughout a paging area formed of several location areas sometimes occurs as a result of "across the border" registration of a mobile terminal. Such a registration occurs when a mobile terminal located in one location area registers with a base station associated with another location area. Broadcasting a page throughout a number of location areas requires the utilization of significant paging resources.

Knowledge of the particular cell in which the mobile terminal had most-recently registered has been superfluous as at least an entire location area is paged. Therefore, even though the identity of the cell in which the mobile terminal was located when the mobile terminal last accessed the communication network is known, such information has not previously been used or otherwise stored to be utilized to page a mobile terminal. Only the identity of the location area in which the mobile terminal is located has been utilized to page the mobile terminal.

With increased usage of such communication systems, the signaling capacity of the communication system is, sometimes, exceeded.

A manner by which to utilize the identity of the cell last accessed by a mobile terminal to make more efficient the paging procedures by which to page a mobile terminal would be advantageous.

Utilization of such information would not significantly increase registration reports as such information is already inherently provided to the network. But advantageous utilization of such information would permit more efficient paging procedures to be utilized to page a mobile terminal.

It is in light of this background information related to paging procedures in a radio communication system to page a mobile terminal that the significant improvements of the present invention have evolved.

SUMMARY OF THE INVENTION

The present invention advantageously provides apparatus, and an associated method, for efficiently paging a mobile terminal operable in a radio communication system.

Information indicative of the position at which the mobile terminal was located when the mobile last accessed a base station of the network infrastructure of the communication system is maintained in a record. When the mobile terminal is later to be paged, such record is utilized to select the paging area throughout which the page is to be broadcast. The paging area is selected to be proximate to the position, of which the information indicative thereof is maintained in the record. A selected number of pages is transmitted throughout the paging area when the mobile terminal is to be paged. If no acknowledgment to the page is detected by the network infrastructure, the paging area is adaptively altered, e.g., expanded. A new paging area is selected to include, e.g., the area proximate to the position from which the mobile terminal last accessed a base station together with an area surrounding the area of such proximity. Pages are broadcast throughout such expanded area. Thereby, the paging area is adaptively selected, all the while, responsive to the information stored in the record.

System paging resources are utilized sparingly without unduly affecting the numbers of times in which the mobile terminal must register with the network. A general savings of paging resources is provided.

In one aspect of the present invention, a base station of a cellular communication system pages a mobile terminal operable therein when a call is to be terminated at the mobile terminal. A record is maintained of the identity of the base station of the cellular network portion last-accessed by the mobile terminal. When a call is to be terminated at the mobile terminal, such record is accessed.

The paging area throughout which a page is to be broadcast to the mobile terminal is adaptively selected. The selection is made responsive to a selected paging strategy and responsive to the information stored in the record. The paging area is, e.g., first selected to be the cell defined by the base station identified in the record. If no response is made to pages broadcast throughout the cell, the paging area is expanded, also to include cells neighboring the cell throughout which the page is first broadcast. If appropriate acknowledgments are not made responsive to paging throughout the expanded area, the paging area is once again expanded. Cells adjacent to the neighboring cells also are additionally selected to form a portion of the paging area. Thereby, the paging area is newly-expanded to include both the areas previously paged and additional areas. Additional pages are sent throughout the newly-expanded paging area.

If no responses to such pages are made, the paging area is again expanded, e.g., first to encompass an entire location area, then, if necessary, to encompass a group of location areas. Neighboring cells may be, e.g., defined to be cells positioned within a certain distance from the center cell. The neighboring cells may also be defined, in conventional manner, as neighbor cells on neighbor cell lists associated with the cells. Or, the neighbor cells may be adaptively selected in a "self-learning" manner. Viz., by teaching the traveling habits of a user of a mobile terminal, the neighbor cells can be defined to be those cells most often frequented by the user of the mobile terminal.

The record of the information related to the identity of the base station last-accessed by the mobile terminal is stored, for example, in a mobile switching center to which groups of spaced-apart base stations are coupled. When a call is to be terminated at a mobile terminal, the mobile switching center selects the paging area throughout which a page is to be broadcast to page the mobile terminal and causes the appropriate base stations to broadcast pages on the paging channels of the respective ones of the base stations.

In another aspect of the present invention, selection of the paging strategy which is determinative, in part, of the size, or granularity, of the paging area is made responsive to the type of call to be terminated at the mobile terminal. A voice, or other real-time, call is distinguished from a data, or other non-real-time, call. The granularity of the paging area accorded to the voice call according to the selected paging strategy is larger than the granularity of the paging area accorded to the data call. A larger granularity corresponds to more parallel paging. Viz., as the granularity of the paging area increases in size, the number of cells throughout which the page is broadcast simultaneously correspondingly increases.

The paging strategy is determinative of the sequence of cell groups paged in paging actions, in which successive pages are broadcast responsive to lack of responses to broadcasts of prior pages. The paging strategy, i.e., sequences of pages, is followed until there is a page response or until an entire paging program has been performed without any page response.

In another aspect of the present invention, selection of the paging strategy, determinative, in part, of the granularity of the paging area is also further made responsive to occupancy levels of usage of the cellular system when the mobile terminal is to be paged. That is to say, during times of heavy usage of the cellular communication system, the paging area granularity is reduced according to the selected paging strategy. And, during levels of low usage of the cellular communication system, the paging area granularity is permitted to be increased according to the selected paging strategy.

Operation of an embodiment of the present invention balances the need to minimize utilization of paging resources with the concurrent need also to minimize utilization of registration resources. The recording and using the position of the mobile terminal at which the mobile terminal last-accessed the network of the cellular communication system does not increase the utilization of registration resources. And, operation of an embodiment of the present invention advantageously makes paging of a mobile terminal more efficient without detrimentally affecting the utilization of the registration resources. Advantage is taken of information known to existing cellular communication systems, but not conventionally utilized for purposes of paging.

In these and other aspects, therefore, an apparatus, and associated method, adaptively selects a paging area in which to page a mobile terminal. The apparatus is for a network device of a cellular communication system having a plurality of spaced-apart base stations. Each base station defines a cell. The mobile terminal is operable at least to acknowledge reception, when received thereat, of a page. A storage element stores data indicative of a last-visited cell. The last-visited cell is defined by a base station of the plurality of base stations last-accessed by the mobile terminal. A granularity selector is operable at least when the mobile terminal is to be paged., The granularity selector adaptively selects a paging area granularity of the paging area over which to page the mobile terminal. The paging area granularity is selected responsive, in part, to a selected paging strategy. The number of pages broadcast throughout the paging area is also responsive, in part, to a selected paging strategy. A paging area selector is coupled to the storage element to access the data stored therein and to the granularity selector to receive indications of the paging area granularity selected thereat. The paging area selector selects the paging area over which to page the mobile terminal responsive to location of the last-visited cell of which the data stored at the storage element is indicative and the paging area granularity selected by the granularity selector.

A more complete appreciation of the present invention and the scope thereof can be obtained from the accompanying drawings which are briefly summarized below, the following detailed description of the presently preferred embodiments of the invention, and the appended claims.

BRIEF DESCRIPTION OF THE DRAWINGS

FIG. 2 illustrates a functional block diagram of a portion of a mobile switching center forming a portion of the system shown in FIG. 1, which includes the apparatus of an embodiment of the present invention for adaptively selecting the paging area throughout which to page a mobile terminal.

FIG. 7 illustrates a functional block diagram of portions of the cellular communication system shown in FIG. 1 in greater detail.

FIG. 8 illustrates a functional block diagram of the information stored in a mobile switching center during operation of an embodiment of the present invention.

FIG. 9 illustrates a functional block diagram, similar to that shown in FIG. 8, but of the information stored in a home location register during operation of an embodiment of the present invention.

DETAILED DESCRIPTION OF THE PRESENT INVENTION

Figure 1:
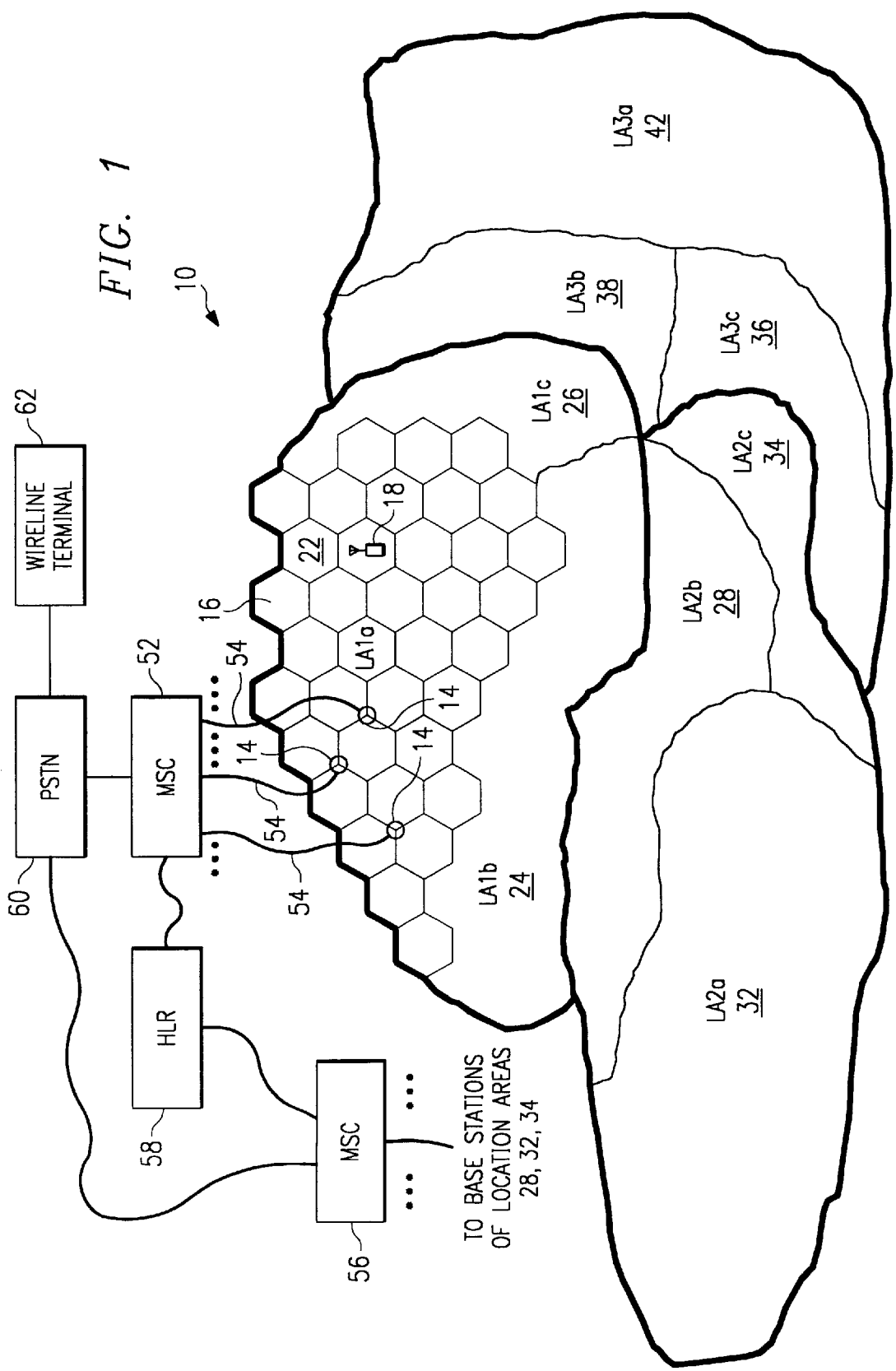
FIG. 1 illustrates a partial functional block, partial schematic diagram of a portion of a cellular communication system in which an embodiment of the present invention is embodied.

Referring first to FIG. 1, a portion of a cellular communication system, shown generally at 10, is shown. An embodiment of the present invention is operable therein.

The network infrastructure of the system 10 includes a plurality of base stations, spaced-apart throughout a geographic area in conventional fashion.

FIG. 1 illustrates several of such base stations 14 positioned throughout a portion of the geographic area encompassed by the cellular communication system 10. In the exemplary embodiment illustrated in the figure, transmitter-receivers are co-located in one base station 14.

Each of the base stations 14 serves three cells 16. When a mobile terminal, such as the mobile terminal 18, is located within a cell 16 served by a particular one of the base stations 14, communications by the mobile terminal 18 are typically effectuated with the base station 14 serving the cell 16 in which the mobile terminal is located.

Groups of the cells 16 served by the base stations 14 together form location areas. The location area 22 is exemplary of a location area defined by a group of cells 16. Here, about thirty cells define the location area. Additional location areas 24, 26, 28, 32, 34, 36, 38, and 42 are further shown in the figure. While not separately illustrated, such additional location areas 24–42 are also defined by groups of cells in manners analogous to the manner by which the cells 16 define the location area 22.

The base stations 14 of the group of the base stations 14 which serve the cells of the location area 22 are coupled to a mobile switching center (MSC) 52 by way of lines 54. The base stations (not separately shown) which serve the location areas 24 and 26 are also coupled to the MSC 52. The base stations serving other groups of three location areas are coupled to other MSCs. For instance, the base stations which serve the location areas 28, 32, and 34 are coupled to the MSC 56.

The MSCs 52 and 56 are coupled to a home location register (HLR) 58. The MSCs 52 and 56, as well as other MSCs, are coupled to a Public Switched Telephone Network (PSTN) 60. Telephonic communications are permitted e.g., between a communication station, such as the wireline terminal 62 and the mobile terminal 18 by appropriate switched connections by way of the PSTN 60, MSC 52, appropriate base station 14, and an air interface forming a link between such base station 14 and the mobile terminal 18.

When a call originated at the wireline terminal 62, or other communication station, is to be terminated at the mobile terminal 18, the mobile terminal 18 is first paged upon a paging channel. Because the precise position at which the mobile terminal 18 is located is uncertain, the paging area throughout which the mobile terminal is paged conventionally initially includes the entire location area in which the mobile terminal has most recently registered. In the exemplary system 10 in which the location areas are formed of approximately thirty cells 16, the paging area is initially formed of such number of cells.

If no acknowledgment to the page is detected, the paging area is increased to encompass, typically, three location areas.

By way of an example, if a page is first transmitted throughout the location area 22, and no acknowledgment to the page is detected, the size of the paging area is increased to include also the location areas 24 and 26. When the location areas 22, 24, and 26 are each formed of approximately thirty cells, in the absence of a response to pages first transmitted throughout the location area 22, pages are transmitted throughout a paging area encompassing approximately ninety cells. Concurrent paging throughout such a large area requires utilization of significant paging resources. If the location areas are formed of even greater numbers of cells, there is a corresponding increase in the paging resources required to page the mobile terminal.

By way of another example, if the mobile terminal is, instead, last-registered in a cell of the location area 24, the paging area is first formed of the location area 24. Again, the paging area is formed of approximately thirty cells. If an acknowledgment to such paging is not detected, the paging area is increased also to include the location areas 22, 26, and 28. When each of the location areas is formed of approximately thirty cells, the paging area encompassing the location areas 22, 24, 26, and 28 encompasses approximately one hundred twenty cells. A significant allocation of paging resources must therefore be allocated to page the mobile terminal.

Operation of an embodiment of the present invention facilitates more efficient utilization of the paging resources available to a cellular communication system. Measurements made in existing cellular communication systems indicate that approximately fifty to seventy percent of mobile terminals respond to a page broadcast throughout the same cell in which the mobile terminal was previously located when last-accessing the cellular network. Measurements further indicate that approximately sixty to eighty percent of the mobile terminals respond to a page broadcast throughout both the same cell in which the mobile terminal was previously located when last-accessing the cellular network and throughout cells which neighbor such cell. And, measurements also indicate that approximately ninety percent of all mobile terminals respond to a page broadcast throughout the same cell in which the mobile terminal was previously located when last-accessing the cellular network together with cells forming neighbor cells thereto and cells which neighbor the neighbor cells.

By taking advantage of the probability that the mobile terminal is located at a position in proximity to the position at which the mobile terminal was previously positioned when last-accessing the cellular network, the paging area in which a page is broadcast during operation of an embodiment of the present invention can be reduced. Thereby, signaling resources are conserved.

During operation of an embodiment of the present invention, a record is maintained which is indicative of the cell in which a mobile terminal was located when last-accessing the network portion of the cellular communication system 10. Such access may, for example, occur when the mobile terminal originates a call, terminates a call by responding to a page, registers, either periodically or when entering a new location area, as a result of a handover during a call, or occur as the mobile terminal ends an ongoing call. By maintaining such a record, the paging area throughout which a page is transmitted can more efficiently be selected, thereby to more efficiently utilize the paging resources available to the communication system.

FIG. 2 illustrates portions of the mobile switching center 52 shown previously in FIG. 1. The portions of the mobile switching center illustrated in the figure are operable to determine the paging area throughout which to page a mobile terminal when a call is to be terminated thereat. While the portions of the mobile switching center 52 are shown functionally for purposes of explanation, such functionality, in one embodiment, is effectuated by processing apparatus having algorithms executable therein. The mobile switching center 56, and other mobile switching centers, can be similarly represented.

Lines 54 extending between the base stations 14 (shown in FIG. 1) and the mobile switching center 52 provide the MSC 52 with indications of the base station 14 last accessed by the mobile terminal 18. Such indications are provided to a mobile terminal record storage element 72. The identity of the mobile terminal 18 is stored in the storage element 72. And, the base station 14 of the last-accessed cell 16 in which the mobile terminal 18 was located when last accessing the cellular network is indexed thereagainst. Each time in which the mobile terminal again accesses the cellular network, an indication of such access is provided to the storage element 72, thereby to update the records stored thereat.

Because each base station 14 (shown in FIG. 1) defines a cell 16 (also shown in FIG. 1), an indication of the cell in which each mobile terminal was located when last-accessing the cellular network is thereby stored in the storage element 72.

An indication of a call to be terminated at the mobile terminal 18 is generated on line 74, coupled to the mobile switching center 52.

The indication is provided to a call-type determiner 76 forming a portion of the MSC 52. The call-type determiner 76 is operable to determine the call-type, viz., the type of call which is to be terminated at the mobile terminal. A determination is made at least as to whether the terminating call is a voice, or other real-time, call or a data, or other non-real-time, call. Determinations made by the determiner 76, in one embodiment, are provided by network signaling by way of the line 74 from the PSTN. In other embodiments, subscriber profiles stored at the MSC 52 are used to make the determinations as to whether there are real-time or non-real-time call requirements on call delivery.

An indication of the call-type determined by the determiner 76 is provided by way of line 78 to a granularity selector 82. The granularity selector 82 is operable to determine, in an adaptive manner, the size of the paging area throughout which a page is to be broadcast to page the mobile terminal at which the call is to be terminated.

The granularity selector 82 is further coupled to receive indications provided by the base stations 14 (shown in FIG. 1) of an acknowledgment to a page broadcast to a mobile terminal during paging operations.

The granularity selector 82 is further coupled, here by way of lines 84, to a traffic level density determiner 86. The traffic level density determiner 86 is, in turn, also coupled to receive indications generated on lines 54 representative of traffic levels throughout the location area controlled by the mobile switching center 52. Indications of the density of traffic levels determined by the determiner 86 are also provided to the granularity selector 82.

The granularity selector is further coupled, here by way of lines 87 to a service subscription level determiner 88. In one embodiment, the service subscription level determiner 88 is also coupled to line 74 to receive indications of the service subscription-type of service to which the mobile terminal is subscribed by way of network signaling. In other embodiments, the determinations are made responsive to a subscriber profile stored at the determiner 88. In such an embodiment, the subscriber profile is also accessible by the call type determiner 76, here by way of line 89, to permit access to the subscriber profile information by the determiner 76. The communication terminal originating the call might also have associated therewith a service subscription level (e.g., a lower cost/lower service level or a higher cost/higher service level). In a cellular communication system to which more than one subscription is permitted concurrently to be subscribed, the service subscription level determiner is provided with indications of the service subscription-type of service of a selected service subscription to be used pursuant to communications with the mobile terminal. The selected service subscription forms the service subscription associated with the mobile terminal.

As noted above, the granularity selector 82 selects the granularity of the area throughout which a page is to be broadcast when a call is to be terminated at a mobile terminal.

The granularity selected by the selector 82 is made responsive to a paging strategy. Selection of the paging strategy to be used is dependent upon determinations made by any one or more of the determiners 76, 86, and 88 or upon a set paging strategy. The average response time by which mobile terminals respond to pages broadcast thereto is dependent upon the selected paging strategy. For instance, if the subscription to which the terminating mobile terminal is subscribed is of a high quality, the paging strategy can be selected to minimize average response time. Analogously, if the call type is that of a real-time, e.g., voice call, the paging strategy can be selected to be of a lower average response time than if the call type is a non-real-time call. And, if the traffic levels of ongoing communications are relatively low, the paging strategy can be selected also to be of a lower average response time than when the traffic levels are high.

In one embodiment, an exemplary paging strategy defines three levels of granularity and the granularity selector 82 selects the granularity according to the paging strategy of the paging area responsive to indications of lack of detection of prior pages broadcast to a mobile terminal. Initially, a paging area of a first granularity is selected by the selector 82. As indicated previously, granularity indicates cell-types to be paged in parallel at a particular point in time. The initial granularity selected by the selector 82 is, in part, responsive to the type of call determined by the determiner 76 to be terminated at the mobile terminal responsive to the service subscription level, and also responsive to the traffic level density determined by the determiner 86 by which the paging strategy is selected by the granularity selector 82.

The granularity selected by the selector 82 is provided, here indicated by way of line 91, to a paging area selector 92. The paging area selector is also coupled, here indicated by way of line 94, to the mobile terminal record storage element 72. The paging area selector 92 is further coupled to receive indications (of the identity of a called terminal), here indicated by way of lines 96, when a call is to be terminated at a mobile terminal. The paging area selector 92 is operable to select the paging area throughout which a mobile terminal is to be paged.

The selection made by the paging area selector 92 is responsive to the granularity of the paging area selected by the granularity selector 82 and the records stored at the storage element 72 of the cell in which the mobile terminal to be paged was last-accessed by such mobile terminal.

Signals are generated by the paging area selector 92 on lines 98 to cause selected base stations to broadcast a page throughout the respective broadcast areas of such selected base stations. The lines 98 extend to the base stations 14 (shown in FIG. 1) to cause the page to be broadcast by the selected base stations, as appropriate. A selected number of pages are broadcast throughout the selected paging area.

In such an exemplary embodiment, in the absence of an acknowledgment to the pages, the granularity selector 82 reselects the granularity of the paging area, here to increase the paging area according to the paging strategy. Indications of the newly-selected granularity are provided to the paging area selector 92, and the paging area selector 92 generates signals on lines 98 to cause the page to be broadcast throughout the enlarged paging area.

In the exemplary embodiment, the granularity selector 82 is operable in a manner to select the granularity of the paging area responsive to the measured probabilities, noted above, of the likely position of a mobile terminal.

That is to say, the granularity selected by the selector 82 is first of a size of a single cell as, stochastically, a mobile terminal is most likely to be located in the same cell in which the terminal had previously been located when last-accessing the cellular network.

If not in the same cell, the mobile terminal is likely to be positioned in a cell neighboring the cell in which the terminal had been positioned when last-accessing the cellular network.

And, if not positioned in such an area, the mobile terminal is likely to be positioned in the cells neighboring the neighbor cells of the cell in which the mobile terminal had previously been located.

The granularity selector 82 is operable in such an embodiment first to select the granularity corresponding to a single cell. If no response to a selected number of pages is detected, the granularity of the paging area is increased to include the area of a single cell together with its neighbor cells. In the exemplary embodiment illustrated in the figure, a timer/supervisor 102 is coupled to the granularity selector 82 by way of line 104. Timing out of the timer/supervisor 102 without detection of a response to the page prompts the granularity selector to reselect the granularity of the paging area.

If no response to a page broadcast throughout such an area is detected, the granularity selector 82 again increases the granularity of the paging area to include a center cell, its neighbors, and neighbors of the neighbor cells. In other embodiments, of course, the granularity selected by the selector 82 can otherwise be selected as desired.

For instance, in another exemplary embodiment, the paging strategy defines four levels of granularity. The first level of granularity is of a location area; the second level of granularity is of a center cell and neighbors thereto; the third level of granularity is of a center cell, its neighbors, and neighbors thereto; and the fourth level of granularity is of three location areas.

Another embodiment includes a paging strategy similar to the one just-described, but the fourth level of granularity is of a location area, and a fifth level of granularity is of three location areas.

Any of many other paging strategies can similarly be implemented to form an average response time as desired.

The paging area selector 92 is operable to cause the paging area, the granularity of which is selected by the granularity selector 82, to be of the granularity determined by the granularity selector and to be centered at, or encompass the cell indicated in the records stored in the storage element 72. To improve the response time, which might be appropriate when a real-time call is to be terminated at the mobile terminal, the paging area may be selected to be of other initial sizes. For instance, the page may first be broadcast throughout an entire location area, then repeated, if necessary throughout the last-accessed cell and its neighbors. If no response is yet detected, the page may thereafter be broadcast through the last-accessed cells, its neighbor cells, and neighbors of such neighbor cells. If further paging is again required, the entire location area can be paged, and finally a group of location areas can be paged. Thereby, more pages can be broadcast throughout an area proximate to the last-known location of the mobile terminal prior to broadcasting the page throughout a group of location areas.

As noted previously, the mobile terminal might register with a base station associated with a location area other than the location area in which the terminal is positioned, viz., an "across the border" registration. By adaptively selecting the paging area throughout which to page the mobile terminal, successful paging of the mobile terminal is facilitated. For instance, a paging area can be selected to be formed of the location area "touched by" the neighboring cells of the "last-accessed" cell. If all of the neighboring cells are within a single location area, a page is broadcast throughout such location area. If the neighboring cells are located in more than one location area, the page is broadcast throughout the additional location areas. Selection of the paging area is again dynamically and adaptively made.

Further modifications to the selection of the paging areas can be made, based upon specific characteristics of certain ones of the cells which are at last-accessed by the mobile terminal. For instance, selection of the paging area can be modified if the last-accessed cell is a notorious transit cell, such as a cell which encompasses a highway. A mobile terminal last-accessing a base station defining such a cell might be more likely to be positioned in a vehicle traveling at a rapid rate. The mobile terminal might be less likely to remain in that cell. Or, for instance, the selection of the paging area might be modified if the last-accessed cell is a cell other than a cell previously accessed by the mobile terminal. Such change in position of the mobile terminal might, e.g., be indicative of operation of the terminal in a moving vehicle. And, so-positioned, the mobile terminal might be less likely to remain in the last-accessed cell.

FIG. 3 illustrates again the location areas 22–42, shown previously in FIG. 1, here to illustrate the paging area initially selected by the paging area selector 92 during operation of an embodiment of the present invention utilizing the first exemplary paging strategy, noted above. The paging area initially selected by the paging area selector is formed of the cell in which the mobile terminal to be paged last-accessed the cellular network. The cell 116 as illustrated in the figure is representative of such a cell selected by the paging area selector 92. Note that in FIGS. 3–6 borders of areas associated with particular mobile services switching centers MSC are drawn with heavy lines whereas borders of location areas are drawn with thinner lines. The designations for location areas LA1*a*, LA1*b*, LA3*c*, etc., are intended to refer to the associated MSC by the numerical digit contained in the abbreviation.

Figure 3:
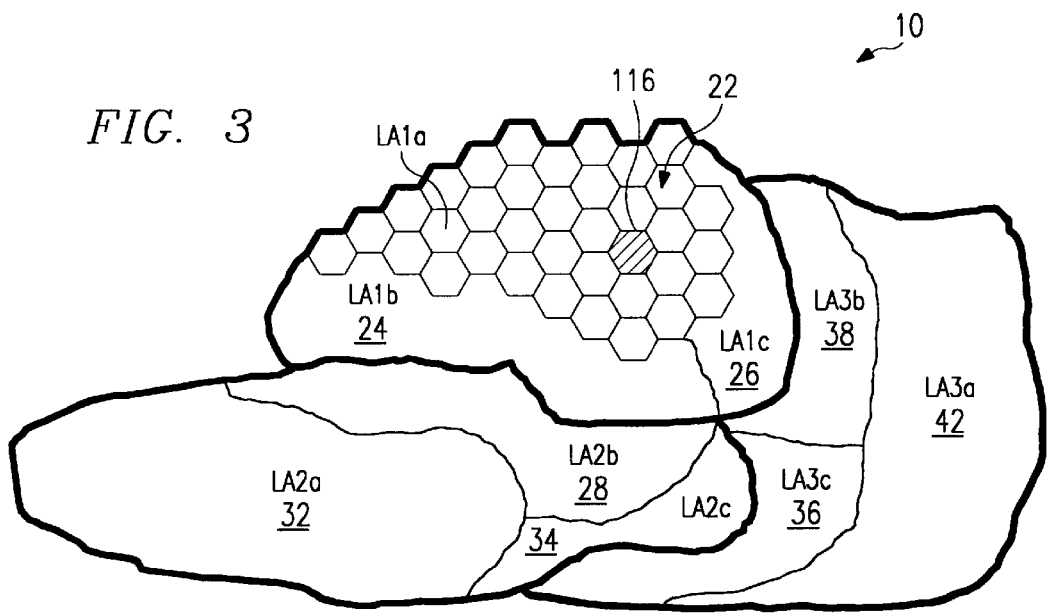
FIG. 3 illustrates a schematic diagram showing a first selected paging area selected during operation of an embodiment of the present invention.
Figure 4:
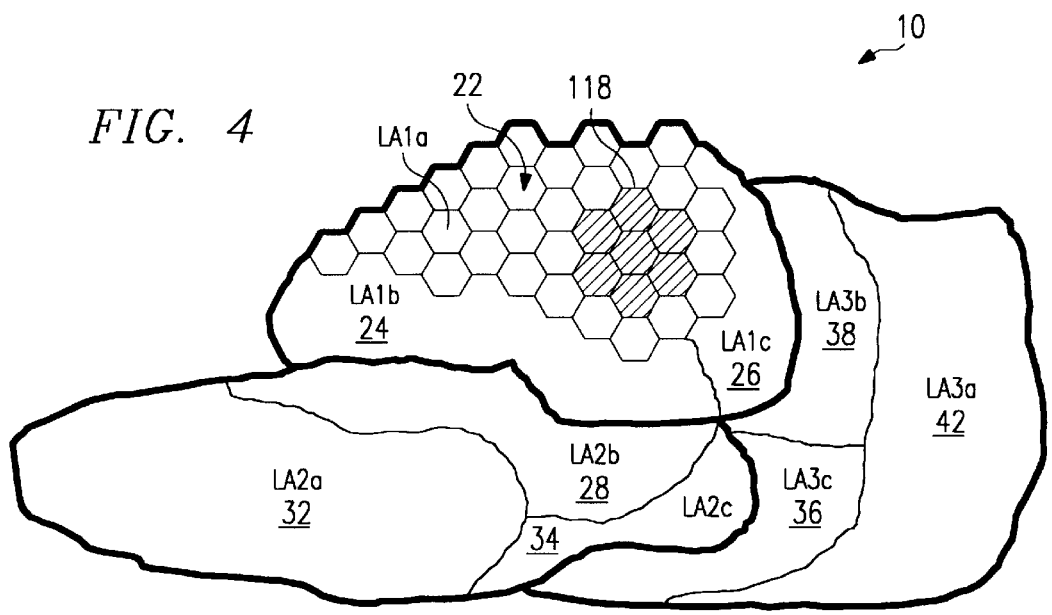
FIG. 4 illustrates a schematic diagram, similar to that shown in FIG. 3, but of a second selected paging area selected during operation of an embodiment of the present invention.
Figure 5:
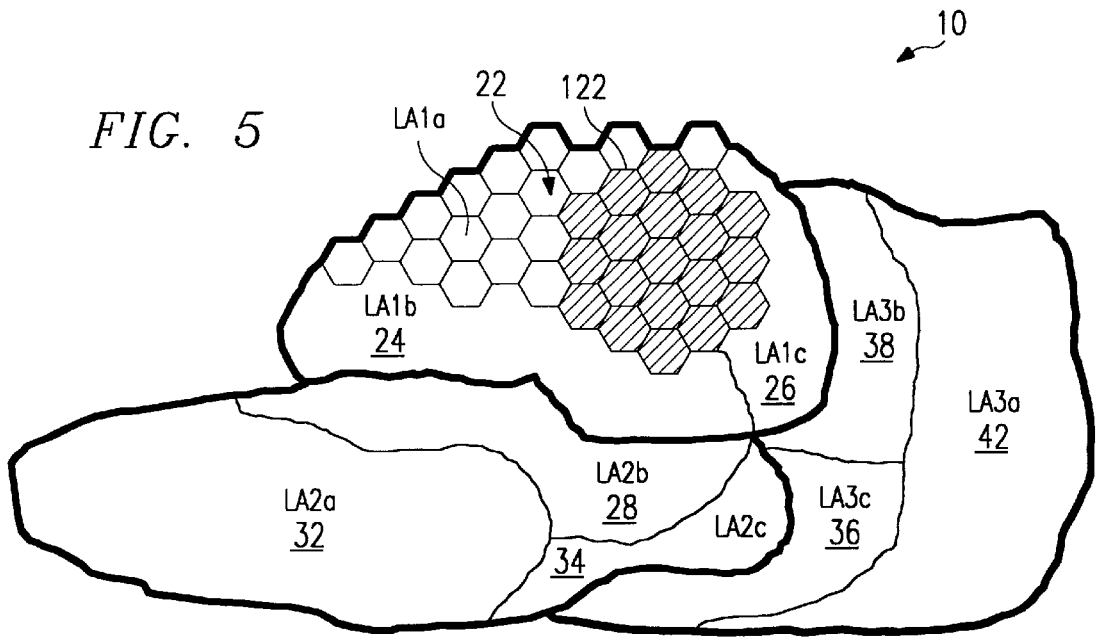
FIG. 5 illustrates a schematic diagram, similar to those shown in FIGS. 3 and 4, but of a third selected paging area selected during operation of an embodiment of the present invention.
Figure 6:
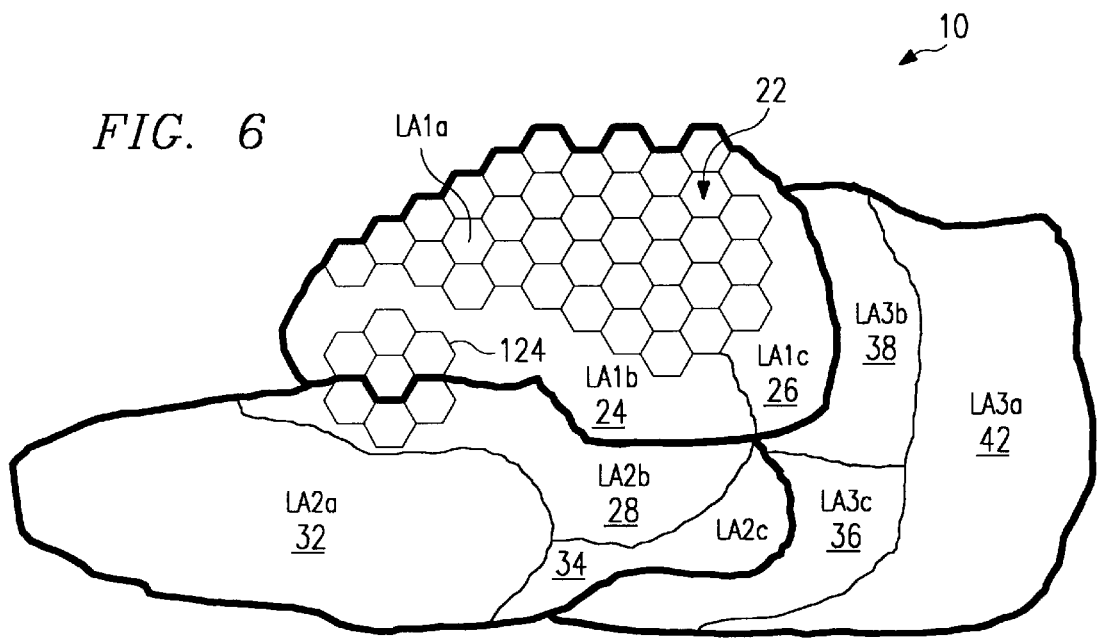
FIG. 6 illustrates a schematic diagram, similar to those shown in FIGS. 3–5, but of another paging area selected during operation of an embodiment of the present invention.

When a selected number of pages have been broadcast throughout the paging area 116 illustrated in FIG. 3 without detection of a response by the paged mobile terminal to the page, the granularity of the paging area is altered, according to the selected paging strategy.

FIG. 4 illustrates again the location areas 22–42 and the paging area, here paging area 118, selected by the paging area selector 92 responsive to a first increase in the paging area granularity by the granularity selector 82, again according to the first exemplary paging strategy, noted above. As illustrated in the figure, the paging area 118 is formed of the cell 16 last-accessed by the mobile terminal together with neighbor cells neighboring the cell.

Another selected number of pages are broadcast throughout the paging area 118. In the absence of detection of a response by the mobile terminal to another selected number of pages broadcast throughout the paging area, here paging area 118, the granularity selector 82 again increases the granularity of the paging area.

FIG. 5 again illustrates the location areas 22–42, here also illustrating the paging area 122 formed when the granularity selector increases the granularity of the paging area a second time, according to the first exemplary paging strategy. The paging area 122 includes the cell in which the mobile terminal last-accessed the cellular network, neighbor cells of the cell, and neighbor cells of the neighbor cells.

FIG. 6 again illustrates the location areas 22–42, here to show the paging area 124 formed when the cell in which the mobile terminal was positioned when last-accessing the cellular network is located on a border between location areas, here location areas 24 and 28. If the paging area granularity is selected according to the first exemplary paging strategy, in manners described above, and in the absence of a response to broadcast of a page throughout a single cell, the paging area is expanded to include neighboring cells. Because the central cell is positioned at a border between location areas, cells neighboring the central cell include cells both in the location areas 24 and 28. Appropriate signaling between the mobile switching centers associated with the separate location areas ensures that the page is broadcast throughout the paging area formed of cells of both of the location areas 24 and 28. That is to say, while the center cell forms a part of location area 24, some cells neighbors thereto form part of location area 28.

FIG. 7 illustrates a portion of the communication system 10, shown previously in FIG. 1. Again, the mobile switching center 52 associated with the location areas 22, 24 and 26 (shown in FIG. 1) is illustrated to be coupled to base stations 14 of which one base station 14 is illustrated in the Figure. Communications with the mobile terminal 18 are permitted by way of a radio link between the base station 14 and mobile terminal 18. And, the mobile switching center 52 is again shown to be coupled to a public switched telephonic network 60.

FIG. 7 further illustrates the mobile switching center 56 associated with the location areas 28, 32, and 34 (shown in FIG. 1). The mobile switching center 56, analogous to the MSC 52, is also coupled to base stations of which the base station 154 is representative. The base station 154 is also capable of communication with the mobile terminal 18 when positioned within the coverage area of the base station 154. The MSCs 52 and 56 are also coupled to permit communications therebetween.

A home location register 162 is further illustrated in the figure, coupled to both the mobile switching center 52 and mobile switching center 56.

The home location register 162 is the home location register of the mobile terminal 18 and is operable in conventional manner to facilitate routing of a call to be terminated at the mobile terminal. Namely, the home location register maintains a registry of the mobile switching center through which a call is to be routed to be terminated at the mobile terminal.

For instance, when a call originated at the wireline terminal 62 is to be terminated at the mobile terminal 18, the registry of the home location register 162 is accessed to facilitate routing of the call to the mobile terminal, all in conventional manner. When the mobile terminal is to be paged, the paging area throughout which the page is to be broadcast is determined at the switching center 52. If the mobile terminal 18 is indicated to have last-accessed the cellular network at a cellular location bordering a second location area, the mobile switching center 56 causes a page to be broadcast throughout the appropriate cells of the second location area 24.

FIG. 8 illustrates the records stored at the mobile terminal record storage element 72 forming a portion of the mobile switching center 52. The records stored in the storage element 72 include the terminal identification record element 174, an activity indication record element 176 and location record element 178.

The terminal identification record element 174 identifies the mobile terminal, such as by its subscriber identification number. In a system to which more than subscription is permitted to be subscribed concurrently at a mobile terminal, the selected subscription is analogously identified. And the activity indication record element 178 identifies the time at which the mobile terminal last made the access. That is to say, a time-stamp is associated with the last-accessed cell. Indications of such time can be used to indicate the likelihood that the mobile terminal remains in the cell.

The location record element 178 contains an indication of the base station last-accessed by the mobile terminal identified by the terminal identification stored in the record element 174. The location record element also may include an indication of, for example, the radio head at which a link was last formed or an antenna lobe of an antenna configuration through which the radio link with the mobile terminal was last formed. A time identifier record element 182 further forms a portion of the records stored at the storage element 72.

Storage of the last-accessed radio head may be, e.g., advantageously used when a distributed antenna is positioned throughout a defined area, such as a building structure. Such information can be used also, e.g., by emergency personnel to locate one requesting emergency assistance.

FIG. 9 illustrates the registry formed at the home location register 162, shown previously in FIG. 7. The registry of the home location register includes a terminal identification/ type record element 184, an activity indication record element 186, and a mobile switching center record element 188 at which a mobile switching center through which a call to be terminated at the mobile terminal identified by the record element 184 is to be routed. A time indicator element 192 further forms a portion of the HLR registry. The time indicator element 192 stores the time-stamp, noted previously.

As a portion of the data related to the position of a mobile terminal is stored at the HLR 162, storage of such data is distributed in nature. The HLR, in conventional fashion, is thereby shown to provide a location pointer to the MSC forming a VMSC (visited mobile switching center), and, with reference to FIG. 8, the MSC provides a more detailed location pointer. Conventionally, the location pointer of the MSC points to an entire location area. In contrast, in an embodiment of the present invention, the location pointer of the MSC points to a "center cell". When a mobile terminal travels from a cell encompassed by one MSC to a cell encompassed by another MSC, the HLR is conventionally immediately accessed and the positional change is reported. During operation of an embodiment of the present invention, registration also occurs during an ongoing call and the mobile terminal passes between cells, such as in the manner just-noted. That is to say, the location record is updated during a call regarding the detailed pointer in the MSC.

Figure 10:
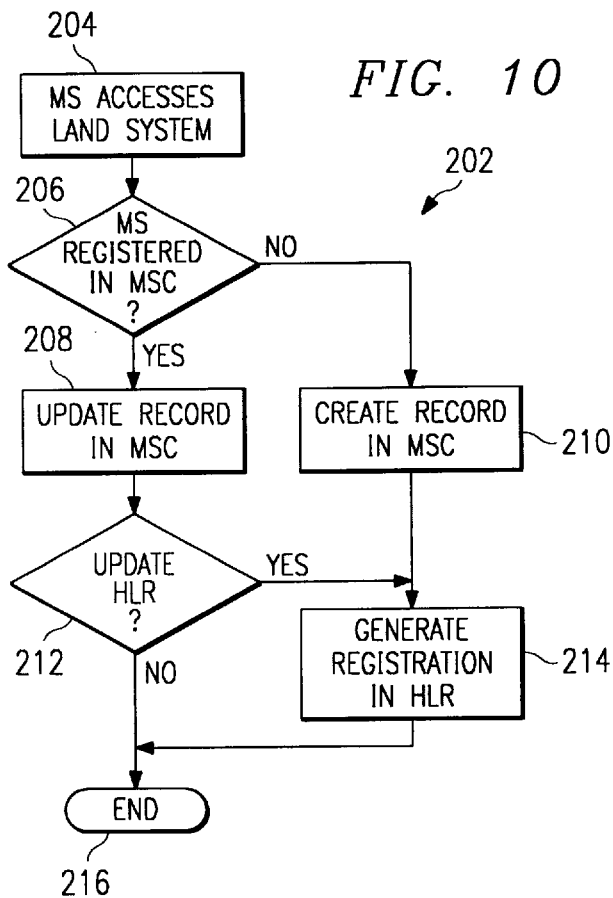
FIG. 10 illustrates a method flow diagram illustrating the method of operation of an embodiment of the present invention by which to register the position at which a mobile terminal is located.

FIG. 10 illustrates a method shown generally at 202 by which recordation of the position of the mobile terminal when last-accessing a cellular network is stored. First, and as indicated by block 204, the mobile terminal accesses the cellular network. The access may, for example, be formed of an originating call access, a terminating call access, a handoff access, or a registration access.

Then, and as indicated by the decision block 206, a determination is made as to whether the mobile terminal is registered in the mobile switching center. If so, the record stored in the mobile terminal record storage element of the mobile switching center is updated, as indicated by the block 208. If, conversely, no record is stored at the mobile switching center, the no branch is taken from the decision block 206 to block 210 whereat a record in the storage element is created.

If the yes branch is taken from the decision block 206 and the record is updated, as indicated by the block 208, a determination is made at the decision block 212 as to whether the HLR needs to be updated. The HLR needs to be updated, e.g., if the mobile terminal has been inactive or powered off (but in which a record is maintained in the MSC) and thereafter powers on/registers. Then the MSC updates the HLR that the status of the mobile has changed from an inactive to an active state. Conversely, for a normal periodic registration from a known location, no information is required to be passed to the HLR. If so indicated, the yes branch is taken to block 214 and updating of a home location register is performed in conventional fashion. Otherwise, the no branch is taken to the end block 216. If the no branch is taken from the decision block 206 and a record is created in the mobile switching center, as indicated by the block 210, a branch is also taken to the block 214 whereat the registration is generated or otherwise updated in the home location register.

Figure 11:
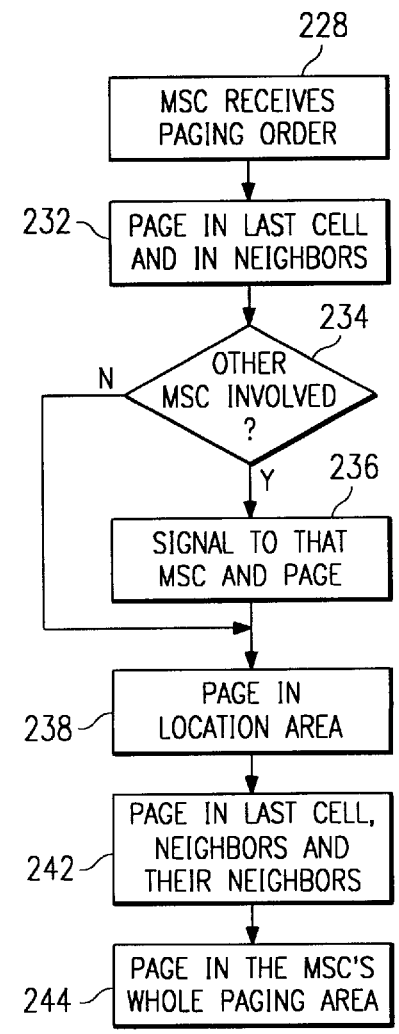
FIG. 11 illustrates a method flow diagram showing the method of operation of an embodiment of the present invention to page a mobile terminal.

FIG. 11 illustrates a method, shown generally at 224, illustrating operation of an embodiment of the present invention for paging a mobile terminal. First, and as indicated by the block 228, a paging order is received at a mobile switching center. Then, and as indicated by the block 232, a page is broadcast throughout a cell last-accessed by the mobile terminal to be paged and throughout neighbor cells thereof.

Then, and as indicated by the decision 234, a determination is made as to whether any other mobile switching center must be accessed to permit the page to be broadcast throughout the appropriate paging area. If so, the yes branch is taken to block 236 whereat the appropriate mobile switching center is signaled and page instructions are generated to cause broadcast of the page throughout the cells defined by the appropriate base stations. For example, one MSC might signal to a neighbor MSC to help paging using a message indicating at least the last cell accessed in the first MSC area and the granularity applied by the first MSC. When the second MSC (or the first MSC) receives a paging response, a message is sent to the other MSC indicating that additional paging is not necessary.

Thereafter, or if the no branch is taken from the decision block 234, a page is broadcast throughout the location area. Then, in the absence of a response to such a page, and as indicated by the block 242, the page is rebroadcast throughout the cell last-accessed by the mobile terminal, the neighbor cells of such cell and cells neighboring such neighbor cells. If still no response to the page is detected, and as indicated by the block 244, a page is broadcast throughout the entire paging area encompassed by the mobile switching center, i.e., in all location areas associated with that mobile switching center.

Therefore, by maintaining a record of the cell in which the mobile terminal was located when last-accessing a base station of the cellular network, more efficient paging operations are possible. Paging resources available to the cellular communication system are sparingly used. Such advantageous use of the paging resources shortens paging response time for calls to be determined at a mobile terminal. Additionally, a differentiated average time-to-page response for real-time versus non-real-time calls can be structured. And, a higher answering probability for all calls is possible.

The previous descriptions are of preferred examples for implementing the invention, and the scope of the invention should not necessarily be limited by this description. The scope of the present invention is defined by the following claims.

What is claimed is:

1. An apparatus for adaptively selecting a paging area in which to page a mobile terminal in a communication system, said apparatus comprising:

a storage element for storing data indicative of a border cell last-accessed by the mobile terminal, said border cell located on a border between a first location area controlled by a first mobile switching center and a second location area controlled by a second mobile switching center;

a granularity selector for adaptively selecting a paging area granularity of the paging area over which to page the mobile terminal, the paging area granularity selected responsive, in part, to a selected paging strategy;

a paging area selector coupled to said storage element to access the data stored therein and to said granularity selector to receive indications of the selected paging area granularity, said paging area selector for selecting the paging area over which to page the mobile terminal responsive to the position of the border cell of which the data stored at said storage element is indicative and the paging area granularity selected by said granularity selector;

wherein the selected paging strategy defines a first level of granularity and the paging area granularity selected by said granularity selector is the first level of granularity corresponding to the border cell;

wherein the selected paging strategy defines a second level of granularity and the paging area granularity selected by said granularity selector is the second level of granularity in the absence of detection of an acknowledgment generated by the mobile terminal when more than a first selected number, but fewer than a second selected number of paging signals are transmitted to page the mobile terminal; and wherein said second level of granularity corresponds to the border cell and neighboring cells including cells within both the first location area and the second location area, said first mobile switching center and said second mobile switching center signal one another to ensure that the paging signals are transmitted in the border cell and the neighboring cells.

2. The apparatus of claim 1 wherein the border cell of which the data stored at said storage element is indicative is defined by a base station at which the mobile terminal last made an originating call access.

3. The apparatus of claim 1 wherein the border cell of which the data stored at said storage element is indicative is defined by a base station at which the mobile terminal last made a terminating call access.

4. The apparatus of claim 1 wherein the border cell of which the data stored at said storage element is indicative is defined by a base station at which the mobile terminal last made a registration access.

5. The apparatus of claim 1 wherein the border cell of which the data stored at said storage element is indicative is defined by a base station at which the mobile terminal last made a handover access.

6. The apparatus of claim 1 wherein said storage element further stores time-stamp data indicative of a time at which the mobile terminal last-accessed a base station defining the border cell.

7. The apparatus of claim 1 wherein said storage element further includes a neighbor cell list for maintaining a list of the border cell and the neighboring cells.

8. The apparatus of claim 1 wherein the selected paging strategy includes a strategy for modifying the paging area granularity selected by said granularity selector when the border cell forms a transit cell.

9. The apparatus of claim 1 further comprising a call type determiner coupled to said granularity selector, said call type determiner for receiving indications of a call-type and determining the call-type of a call for which the mobile terminal is to be paged.

10. The apparatus of claim 9 wherein the call-type further includes a real-time call or a non-real-time call.

11. The apparatus of claim 1 further comprising a traffic-level determiner coupled to said granularity selector, said traffic-level determiner for receiving indications of traffic-levels and determining the traffic-levels of ongoing communications in the communication system.

12. The apparatus of claim 1 further comprising a service subscription determiner coupled to said granularity selector, said service subscription determiner for receiving indications of a service subscription and determining the service subscription associated with at least one of an originating party and the mobile terminal to be paged.

13. The apparatus of claim 1, wherein the selected paging strategy defines a third level of granularity and the paging area granularity selected by said granularity selector is the third level of granularity in the absence of detection of an acknowledgment generated by the mobile terminal when more than a third selected number, but fewer than a fourth selected number of paging signals are transmitted to page the mobile terminal, said third level of granularity corresponds to the first location area and the second location area, said first mobile switching center and said second mobile switching center signal one another to ensure that the paging signals are transmitted in the first location area and the second location area.

14. A method for adaptively selecting a paging area in which to page a mobile terminal, said method comprising the steps of:

storing data indicative of a border cell last-accessed by the mobile terminal, said border cell located on a border between a first location area controlled by a first mobile switching center and a second location area controlled by a second mobile switching center;

adaptively selecting a paging area granularity of the paging area over which to page the mobile terminal, the paging area granularity adaptively selectable responsive, in part, to a selected paging strategy;

adaptively selecting the paging area over which to page the mobile terminal responsive to the position of the border cell of which the data stored during said step of storing is indicative and responsive to the paging area granularity selected during said step of selecting the paging area granularity;

wherein the selected paging strategy defines a first level of granularity and the selected paging area granularity is the first level of granularity corresponding to the border cell;

wherein the selected paging strategy defines a second level of granularity and the selected paging area granularity is the second level of granularity in the absence of detection of an acknowledgment generated by the mobile terminal when more than a first selected number, but fewer than a second selected number of paging signals are transmitted to page the mobile terminal; and wherein said second level of granularity corresponds to the border cell and neighboring cells including cells within both the first location area and the second location area, said first mobile switching center and said second mobile switching center signal one another to ensure that the paging signals are transmitted in the border cell and the neighboring cells.

15. The method of claim 14 wherein the selected paging strategy defines a third level of granularity and the paging area granularity selected by said granularity selector is the third level of granularity in the absence of detection of an acknowledgment generated by the mobile terminal when more than a third selected number, but fewer than a fourth selected number of paging signals are transmitted to page the mobile terminal, said third level of granularity corresponds to the first location area and the second location area, said first mobile switching center and said second mobile switching center signal one another to ensure that the paging signals are transmitted in the first location area and the second location area.

16. A method for paging a mobile terminal, said method comprising the steps of:

determining a position of a border cell last-accessed by the mobile terminal, said border cell located on a border between a first location area controlled by a first mobile switching center and a second location area controlled by a second mobile switching center;

selecting a paging strategy by which to page the mobile terminal;

determining a paging area granularity by which to page the mobile terminal, the paging area granularity determined responsive to the paging strategy selected during said step of selecting the paging strategy;

selectively paging the mobile terminal over a selected paging area, the selecting paging area selected responsive to the paging area granularity and the position of the border cell determined during said steps of determining the paging area granularity and determining the position, respectively;

wherein the selected paging strategy defines a first level of granularity and the selected paging area granularity is the first level of granularity corresponding to the border cell;

wherein the selected paging strategy defines a second level of granularity and the selected paging area granularity is the second level of granularity in the absence of detection of an acknowledgment generated by the mobile terminal when more than a first selected number, but fewer than a second selected number of paging signals are transmitted to page the mobile terminal; and wherein said second level of granularity corresponds to the border cell and neighboring cells including cells within both the first location area and the second location area, said first mobile switching center and said second mobile switching center signal one another to ensure that the paging signals are transmitted in the border cell and the neighboring cells.

17. The method of claim 16, wherein the selected paging strategy defines a third level of granularity and the paging area granularity selected by said granularity selector is the third level of granularity in the absence of detection of an acknowledgment generated by the mobile terminal when more than a third selected number, but fewer than a fourth selected number of paging signals are transmitted to page the mobile terminal, said third level of granularity corresponds to the first location area and the second location area, said first mobile switching center and said second mobile switching center signal one another to ensure that the paging signals are transmitted in the first location area and the second location area.

* * * * *